(12) United States Patent
Nagpal et al.

(10) Patent No.: US 10,613,966 B2
(45) Date of Patent: Apr. 7, 2020

(54) METHOD OF CONTROLLING AUTOMATION OF TESTING APPLICATIONS AND A SYSTEM THEREFOR

(71) Applicant: WIPRO LIMITED, Bangalore (IN)

(72) Inventors: Vishal Nagpal, Bangalore (IN); Jeevan Kumar S, Bangalore (IN); Dayananda Chowdanakuppe Shivalingaiah, Bangalore (IN); Linish Hariharan, Coimbatore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/468,495

(22) Filed: Mar. 24, 2017

(65) Prior Publication Data

US 2018/0225190 A1    Aug. 9, 2018

(30) Foreign Application Priority Data

Feb. 9, 2017 (IN) .............................. 201741004761

(51) Int. Cl.
  *G06F 11/36* (2006.01)
  *G06F 16/23* (2019.01)
  *G06F 16/22* (2019.01)

(52) U.S. Cl.
  CPC ........ *G06F 11/368* (2013.01); *G06F 11/3672* (2013.01); *G06F 16/2228* (2019.01); *G06F 16/235* (2019.01)

(58) Field of Classification Search
  CPC .................................................. G06F 11/368

USPC ......................................................... 717/124
See application file for complete search history.

(56) References Cited

U.S. PATENT DOCUMENTS

| 5,557,774 | A | 9/1996 | Shimabukuro et al. | |
| 5,978,940 | A | 11/1999 | Newman et al. | |
| 2010/0229155 | A1* | 9/2010 | Adiyapatham | G06F 11/3672 717/124 |
| 2013/0086420 | A1* | 4/2013 | Sgro | G06F 11/3692 714/32 |
| 2016/0292143 | A1* | 10/2016 | Rametta | G06F 9/453 |

\* cited by examiner

*Primary Examiner* — Chat C Do
*Assistant Examiner* — Bradford F Wheaton
(74) *Attorney, Agent, or Firm* — Finnegan, Henderson, Farabow, Garrett & Dunner, LLP

(57) ABSTRACT

Embodiments of the present disclosure relates to a method and a system for controlling automation of testing applications. In an embodiment, automation test scripts read from automation test framework are processed to determine a unique key reference value and map with a plurality of automation test scripts stored in a master test repository. Based on the mapping, manual step information comprising at least a step description and expected result of the mapping automation test script is derived and updated in the master test repository for future references. Thus, the method and the system enables reusing of available manual step information for automation test scripts to generate manual steps thereby, minimizing time and cost involved in creating manual steps for automation of testing applications.

8 Claims, 5 Drawing Sheets

METHOD OF CONTROLLING AUTOMATION OF TESTING APPLICATIONS AND A SYSTEM THEREFOR

FIELD OF THE DISCLOSURE

The present subject matter is related, in general to testing applications, and more particularly, but not exclusively to a controlling automation of testing by reusing test steps in testing environment.

BACKGROUND

Testing of applications can be an expensive task and automation of testing is more expensive as it involves ensuring that there is a traceability of steps between automation step and corresponding manual step. For an automation engineer, creating automation step is a value add and manual step is an essential non-value add activity. A team member's productivity is counted based on automated step and not on manual step in scripts. Currently, creating manual steps by human testers, involves huge cost and becomes problematic for large, long-lived projects which might carry hundreds of such steps. To control the increasing cost involved in testing and to improve the productivity, there is a need for a method and a system that controls the automation of testing by reusing the test steps in a testing environment and improves the productivity of the testers.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of controlling automation of testing applications. The method includes receiving a plurality of automation test scripts as input from a test automation framework. The method further includes determining a unique key reference value for each of the plurality of automation test scripts based on one or more parameters associated with the plurality of automation test scripts. The method further derives manual step information comprising at least a step description and expected test results from a master test repository corresponding to the unique key reference value determined for each of the plurality of automation test scripts. Upon deriving, the method maps the step description and the expected test results to corresponding automation test script of the plurality of test scripts in the test automation framework and updates the master test repository with the step description, the expected test results and the unique key reference value mapped with the automation test script of the plurality of automation test scripts.

Further, the present disclosure relates to a test automation system. The system includes at least a master test repository configured to store a plurality of historical test scripts, corresponding manual step information and unique key reference value associated with the plurality of historical test scripts. The system further comprises a processor coupled with the master test repository. The system also includes a memory communicatively coupled with the processor, wherein the memory stores processor-executable instructions, which, on execution, cause the processor to receive a plurality of automation test scripts as input from a test automation framework. Further, the processor is configured to determine a unique key reference value for each of the plurality of automation test scripts, based on one or more parameters associated with the plurality of automation test scripts. The processor further derives manual step information comprising at least a step description and expected test results from a master test repository corresponding to the unique key reference value determined for each of the plurality of automation test scripts. Upon deriving, the processor maps the step description and the expected test results to corresponding automation test script of the plurality of test scripts in the test automation framework and updates the master test repository with the step description, the expected test results and the unique key reference value mapped with the automation test script of the plurality of automation test scripts.

Furthermore, the present disclosure relates to a non-transitory computer readable medium including instructions stored thereon that when processed by at least one processor cause a test automation system to receive a plurality of automation test scripts as input from a test automation framework. The at least one processor further determines a unique key reference value for each of the plurality of automation test scripts, based on one or more parameters associated with the plurality of automation test scripts. Upon determining, the processor derives manual step information comprising at least a step description and expected test results from a master database corresponding to the unique key reference value determined for each of the plurality of automation test scripts and maps the derived manual step information to corresponding automation test script of the plurality of automation test scripts in the test automation framework. Furthermore, the processor updates a master test repository with the step description, the expected test results and the unique key reference value mapped with the automation test script of the plurality of automation test scripts.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a pert of this disclosure, illustrate exemplary embodiments and, together with the description, serve to explain the disclosed embodiments. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
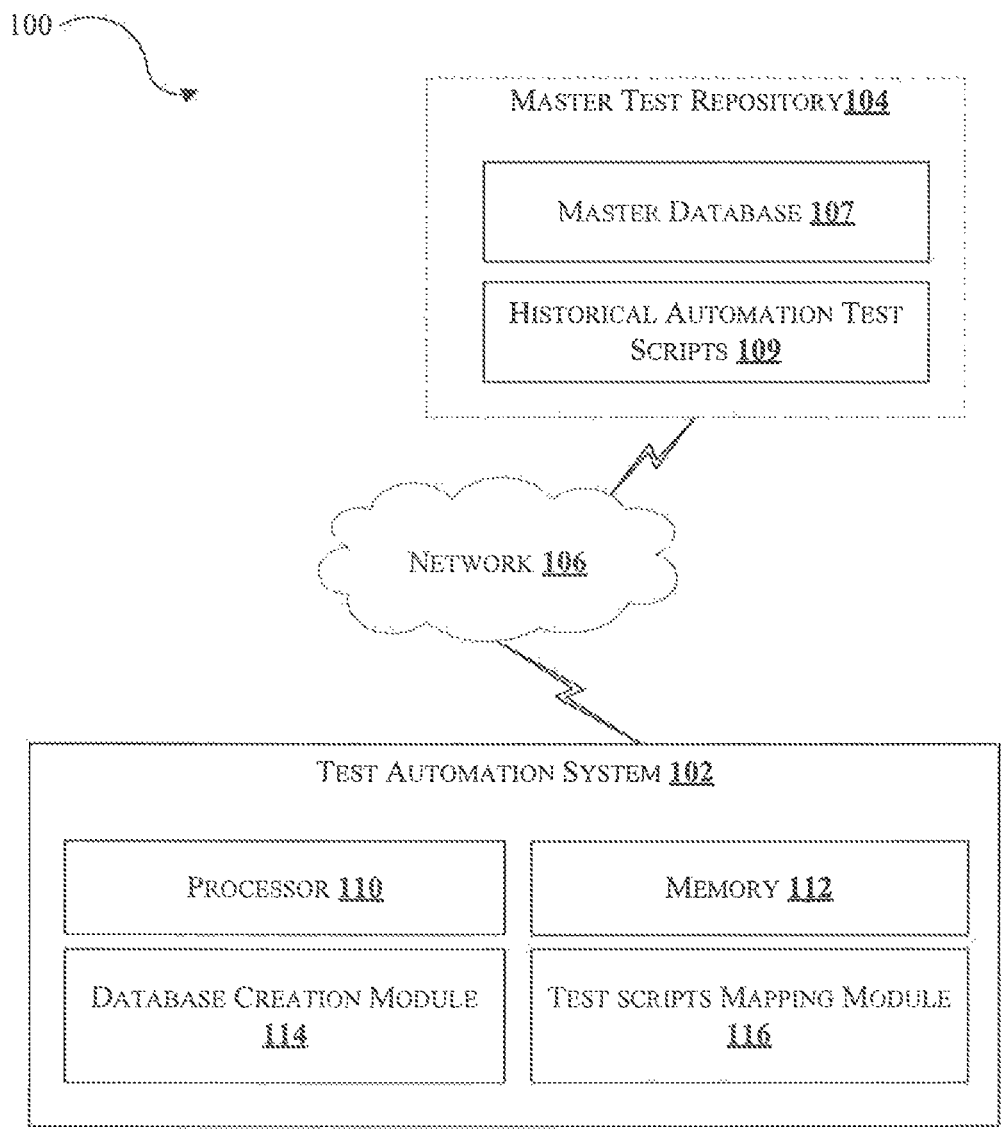
FIG. 1 illustrates an architecture diagram of an exemplary system for controlling automation of testing applications in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", "include(s)", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relates to a method and a system for controlling automation of testing applications. In an embodiment, automation test scripts read from automation test framework are processed to determine a unique key reference value and map with a plurality of automation test scripts stored in a master test repository. Based on the mapping, manual step information comprising at least a step description and expected result of the mapping automation test script is derived and updated in the master test repository for future references. Thus, the method and the system enables reusing of available manual step information for automation test scripts to generate manual steps thereby, minimizing time and cost involved in creating manual steps for automation of testing applications.

In the following detailed description of the embodiments of the disclosure, reference is made to the accompanying drawings that form a part hereof and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an architecture diagram of an exemplary system for controlling automation of testing applications in accordance with some embodiments of the present disclosure.

As shown in FIG. 1, the exemplary system 100 comprises one or more components configured for controlling automation of testing applications. The system 100 may be implemented using a single computer or a network of computers including cloud-based computer implementations. In one embodiment, the exemplary system 100 comprises a test automation system (hereinafter referred to as TAS) 102, and a master test repository 104 connected via a communication network 106. The TAS 102 may be implemented as a reusable automation framework that facilitates reuse of manual steps during automation of test scripts in testing. The TAS 102 retrieves the manual steps from the master test repository 104 for reuse during automation of test scripts.

The master test repository 104 is configured to store the manual steps in one or more master databases 107. Each master database 107 contains all information related to test scripts in the automation framework. In one embodiment, the master database 17 comprises at least historical automation test scripts 109, and metadata associated with the test scripts including name of the test scripts, one or more steps of each test script, step name, step description, expected result and other related information. Step description and expected results are hereinafter collectively referred to as manual step information. The master test repository 104 provides access to the manual step information of existing historical automation test scripts 109 to the TAS 102 for reuse. The master test repository 104 is also configured to store reusable scripts, repository of objects, a plurality of test data, one or more test suites, and reports generated during execution of test scripts in specific language, for example Hyper Text Markup Language (HTML). The master test repository 104 may be, in one embodiment, is configured as integrated repository within the TAS 102. In an embodiment, the master test repository 104 may be implemented as standalone storage system disposed external to the TAS 102.

Figure 2:
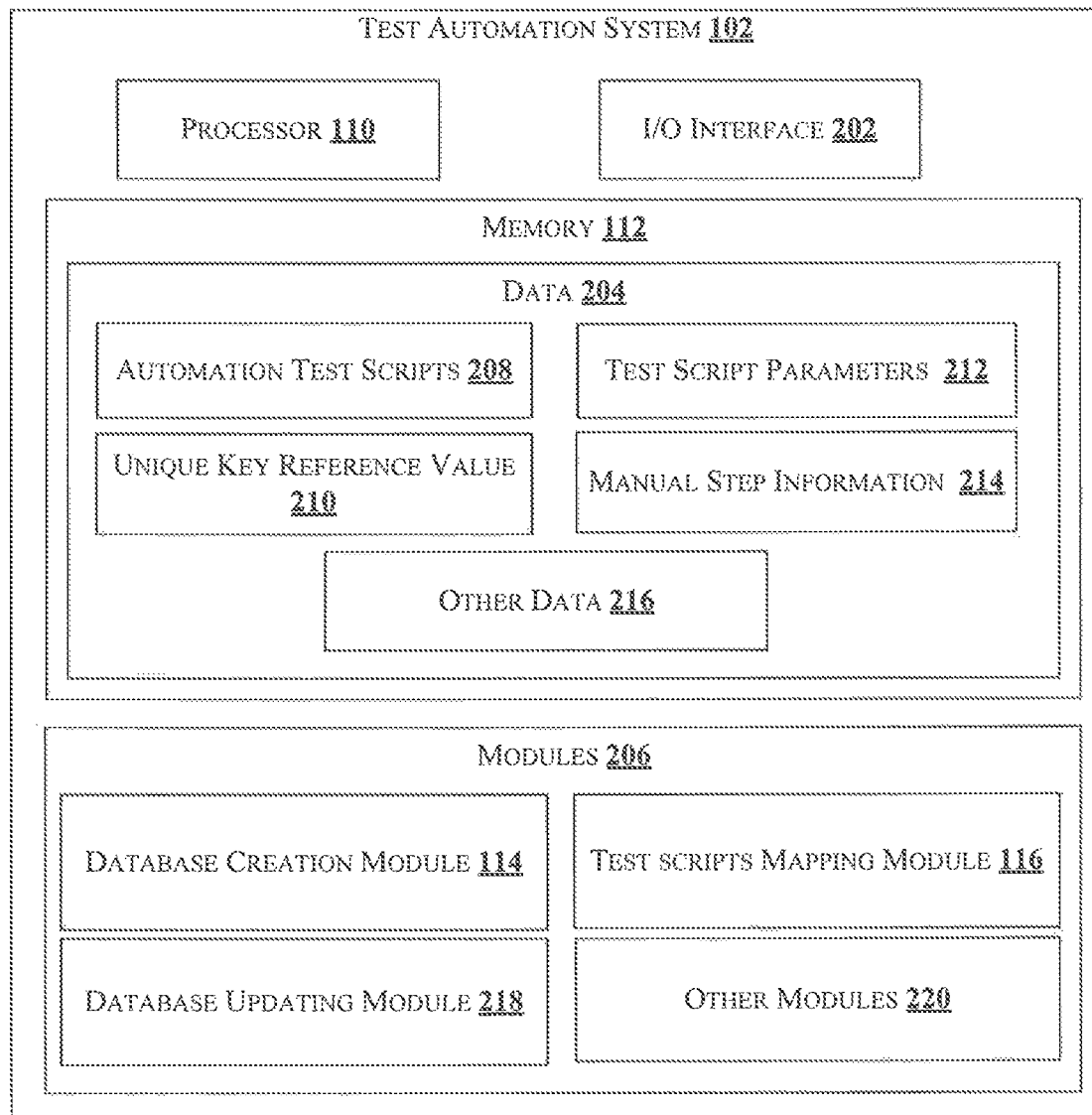
FIG. 2 illustrates an exemplary block diagram of a test automation system of FIG. 1 in accordance with some embodiments of the present disclosure.

The TAS 102 comprises at least a processor 110 and a memory 112 coupled with the processor 110. The TAS 102 also includes a database creation module 114 and a test scripts mapping module (hereinafter referred to as mapping module) 116. The database creation module 114 is configured to enable creation of databases that comprises manual steps, and the mapping module 116 maps automation test scripts with corresponding manual steps to enable reuse of manual steps stored in the databases. In one embodiment, the TAS 102 may be a typical TAS as illustrated in FIG. 2. The TAS 102 comprises the processor 110, the memory 112, and an I/O interface 202. The I/O interface 202 is coupled with the processor 110 and an I/O device. The I/O device is configured to receive inputs via the I/O interface 202 and transmit outputs for displaying in the I/O device via the I/O interface 202. The I/O interface 202 may be configured to input automation test scripts for which corresponding manual steps are determined and mapped by the TAS 102.

The TAS 102 further includes data 204 and modules 206. In one implementation, the data 204 may be stored within the memory 112. In one example, the data 204 may include automation test scripts 208, unique key reference value 210, test script parameters 212, manual step information 214 and other data 216. In one embodiment, the data 204 may be stored in the memory 112 in the form of various data structures. Additionally, the aforementioned data can be organized using data models, such as relational or hierarchical data models. The other data 216 may be also referred to as reference repository for storing recommended implementation approaches as reference data. The other data 216 may also store data, including temporary data, temporary files and predetermined domain specific meta-data, filter conditions, condition separators, transformation operators and functions, generated by the modules 206 for performing the various functions of the TAS 102.

The modules 206 may include, for example, the database creation module 114, the mapping module 116, and a database updating module 218. The modules 206 may also comprise other modules 220 to perform various miscellaneous functionalities of the TAS 102. It will be appreciated that such aforementioned modules may be represented as a single module or a combination of different modules. The modules 206 may be implemented in the form of software, hardware and/or firmware.

In operation, the TAS 102 controls the automation of testing applications by reusing manual steps of previous automation test scripts thereby, minimizing time and cost involved in creating new manual steps for automation of new test scripts. In one embodiment, the master test repository 104 is preconfigured with a plurality of manual steps for a plurality of automation test scripts. The database creation module 114 is configured to create one or more master file or databases comprising the plurality of manual steps and meta data associated with the plurality of manual steps such as manual step information including step name, step description and expected results. In one embodiment, the database creation module 114 receives a path of an automation framework folder as input and accesses the plurality of automation test scripts stored in the automation framework. In one example, the database creation module 114 may access the test scripts folder in the automation framework to access the plurality of training automation test scripts stored in the master test repository 104. An exemplary historical automation test script may comprise one or more parameters such as step name, object name, related action, parameter and error handler and other related parameters.

The database creation module 114 reads the plurality of training test scripts from the test scripts folder, the one or more parameters associated with each historical test script 107 and generates a unique key reference value for each training test script. In one example, the unique key reference value may be a concatenation of the one or more parameters of the training test script. Upon generating the unique key reference value, the database creation module 114 determines as to whether the generated, unique key reference value already exists in the master test repository 104. In one implementation, if the database creation module 114 determines that the generated unique key reference value already exists, then the unique key reference value is generated for the next training test script. In an implementation, if the database creation module 114' determines that the generated unique key reference value do not exists, then the manual step information corresponding to the generated unique key reference value is derived. In one embodiment, the database creation module 114 derives the manual step information comprising the step description and expected results associated with the training test script and creates the master database 107. In one example, the database creation module 114 creates the master database 107 comprising the step name, step description and expected results of the step and proceeds to read the next training test script. Further, the database creation module 114 updates the master test repository 104 with the created master database 104, the generated unique key reference value, and the training test script as historical test script 107. Creation of the master database 107 enables the TAS 102 to reuse the manual steps of the historical test scripts for new automation test scripts received during testing automation.

In one embodiment, the TAS 102 reuses manual steps from the master database 107 for new automation test scripts based on the unique key reference value. The mapping module 116 receives automation test scripts 208 as input from testers or users of the automation framework. The mapping module 116 reads each automation test script 208 in an iteration and generates a unique key reference value 210 for each of the read automation test scripts 208 based on the one or more parameters associated with the automation test scripts 208. In one implementation, the unique key reference value 210 may be generated by concatenation of the one or more parameters of the automation test scripts 208. In an implementation, the unique key reference value 210 may be generated by any other known unique key generation techniques. Upon generating the unique key reference value, the mapping module 116 determines as to whether the generated unique key reference value already exists in the master database 107.

In one implementation, if the mapping module 116 determines that the generated unique key reference value 210 do not exists in the master database 107, then the mapping module 116 creates a blank manual step comprising blank step description and expected results and maps the blank manual step with the automation test script 208 and proceeds to read the next automation test script 208. In another implementation, if the mapping module 116 determines that the generated unique key reference value 210 already exists in the master database 107, then the mapping module 116 derives the corresponding manual step information such as the step description and expected results from the master database 107, maps the derived manual step information with the automation test script 208 and proceeds to read the next automation test script 208. Thus, the TAS 102 enables reuse of the manual steps of the master database 107 for the automation test script 208 without recreating the manual steps.

and accesses the plurality of automation test scripts stored in the automation framework. In one example, the database creation module 114 may access the test scripts folder in the automation framework to access the plurality of training automation, test scripts stored in the master test repository 104. An exemplary historical automation test script may be illustrated as shown below in Table 1:

TABLE 1

| Step Name | Screen Name | Object Name | Action | Parameter | ErrorHandler |
|---|---|---|---|---|---|
| Step 1 | | | LAUNCH | APPLICATION_PATH | Next_TestCase |
| Step 2 | Screen_Login | User_Name | WAIT | 2 | Next_TestCase |
| Step 3 | | | EXECUTE | GTM_LOGIN | Next_TestCase |
| Step 4 | | | WAIT | 5 | |

The TAS 102 continuously updates the master test repository 104 in incremental manner. In one embodiment, the database updating module 218 dynamically updates the master test repository 104 with new unique key reference values, new keywords, object names and so on that were not existing in the master database 17 during an iteration. The TAS 102 therefore, enables continuous learning and updating of the master test repository 104 in each iteration, thereby enabling effective reuse of the manual steps in future automation. Thus, the system 100 enables reusing of available manual step information for automation test scripts to generate manual steps thereby, minimizing time and cost involved in creating manual steps for automation of testing applications.

Figure 3A:
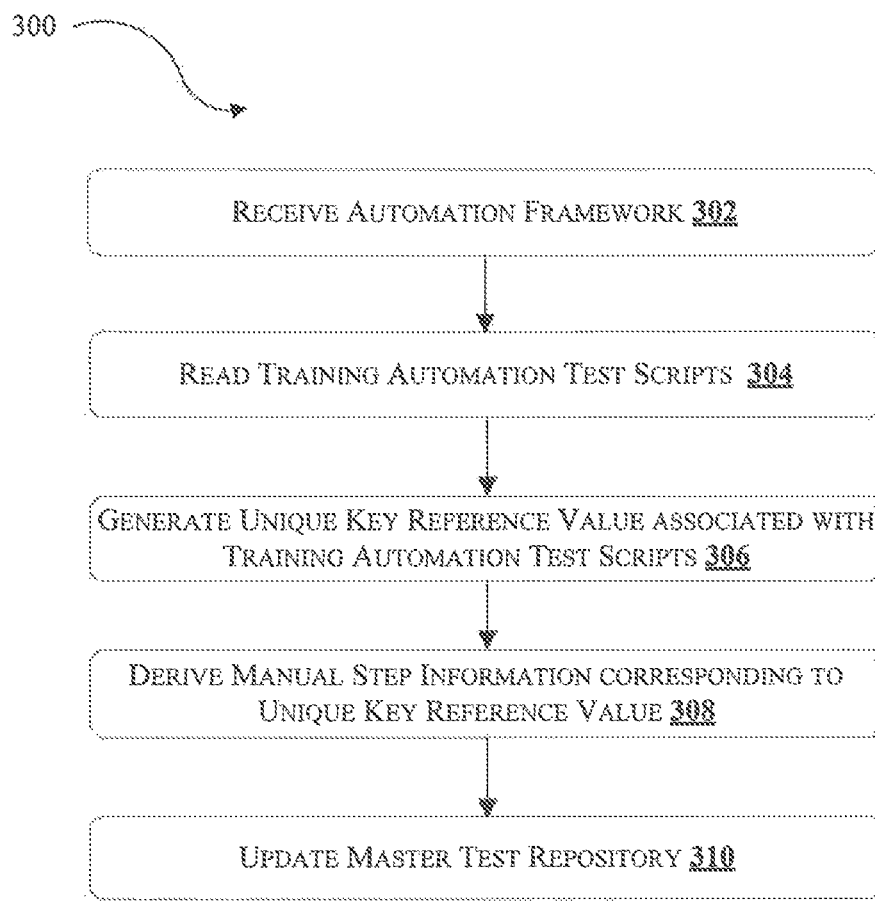
FIG. 3a illustrates a flowchart of an exemplary method of creating master database in accordance with some embodiments of the present disclosure.

FIG. 3a illustrates a flowchart of an exemplary method of creating master database in accordance with some embodiments of the present disclosure.

As illustrated in FIG. 3a, the method 300 comprises one or more blocks implemented by the processor 110 for creating master database. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method 300. Additionally, individual blocks may be deleted from the method 300 without departing from the scope of the subject matter described herein. Furthermore, the method 300 can be implemented in any suitable hardware, software, firmware, or combination thereof.

At block 302, automation framework is received. In one embodiment, the master test repository 104 is preconfigured with a plurality of manual steps for a plurality of automation test scripts. The database creation module 114 is configured to create one or more master file or databases comprising the plurality of manual steps and meta data associated with the plurality of manual steps such as manual step information including step name, step description and expected results. In one embodiment, the database creation module 114 receives a path of an automation framework folder as input At block 304, training automation test scripts are read. In one embodiment, the database creation module 114 reads the plurality of training test scripts from the test scripts folder, the one or more parameters associated with each historical test script 107.

At block 306, unique key reference value associated with training automation test script is generated. In one embodiment, the database creation module 114 generates a unique key reference value for each training test script. In one example, the unique key reference value may be a concatenation of the one or more parameters of the training test script. For example, the unique key reference value for STEP 1 would be as illustrated below in illustration (1)

$$Screen\_Login+User\_Name+WAIT+2 \qquad (1)$$

At block 308, manual step information corresponding to the unique key reference value is derived. In one embodiment, the database creation module 114 determines as to whether the generated unique key reference value already exists in the master test repository 104. In one implementation, if the database creation module 114 determines that the generated unique key reference value already exists, then the unique key reference value is generated for the next training test script. In another implementation, if the database creation module 114 determines that the generated unique key reference value do not exists, then the manual step information corresponding to the generated unique key reference value is derived. In one embodiment, the database creation module 114 derives the manual step information comprising the step description and expected results associated with the training test script and creates the master database 107. In one example, the database creation module 114 creates the master database 107 comprising the step name, step description and expected results of the step having the step name and proceeds to read the next training test script. A sample master database 107 is illustrated as shown below in Table 2:

TABLE 2

| Step Name | Step description | Expected Result |
| --- | --- | --- |
| EXECUTEGTM_Login | Call the reusable script | Call the reusable script |
| IMS_Blotterselmt_HomeCLICK | Click on the object | User should be able to click on the object as expected |
| IMS_Blotterselmt_IMS_BlottersCLICK | Click on the object | User should be able to click on the object as expected |
| AllocationPageInk_AllocationCLICK | Click on the object | User should be able to click on the object as expected |

At block 310, master test repository is updated. In one embodiment, the database creation module 114 updates the master test repository 104 with the created master database 104, the generated unique key reference value, and the training test script as historical test script. Creation of the master database 107 enables the TAS 102 to reuse the manual steps of the historical test scripts for new automation test scripts received during testing automation. Thus, the method 300 enables creation of master database 107 that comprises manual step information of training automation test scripts that can be reused during automation.

Figure 3B:
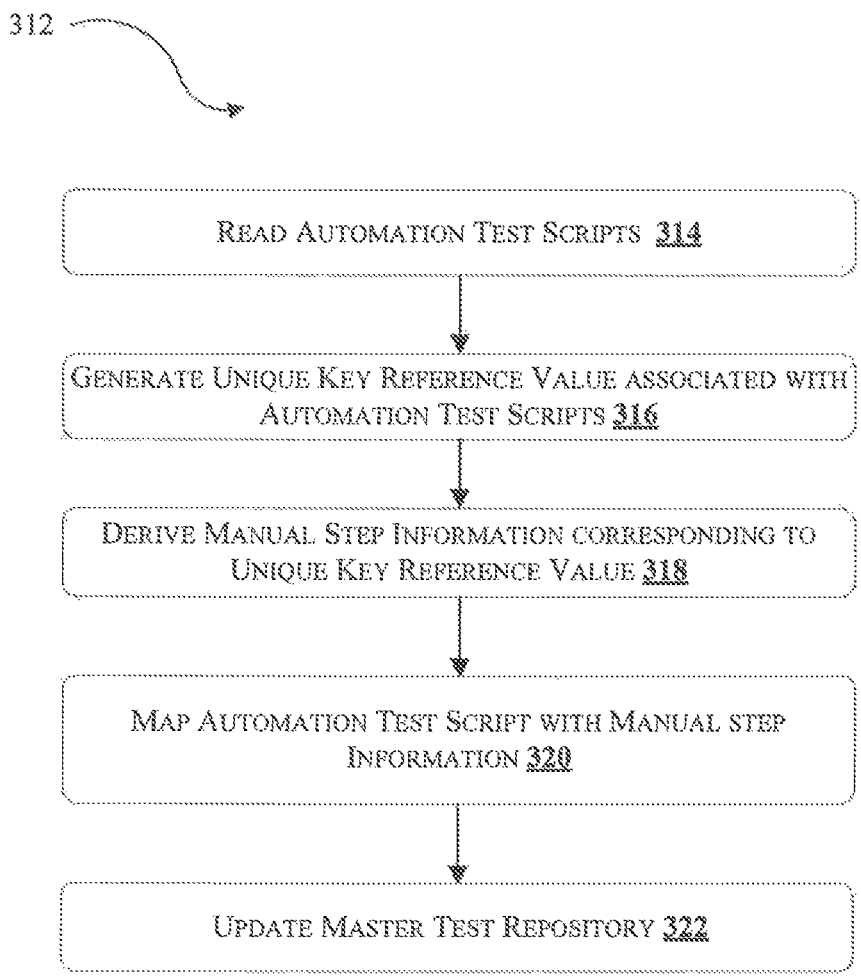
FIG. 3b illustrates a flowchart of an exemplary method of mapping of manual steps from master database in accordance with some embodiments of the present disclosure.

FIG. 3b illustrates a flowchart of an exemplary method of mapping of manual steps from master database in accordance with some embodiments of the present disclosure; and As illustrated in FIG. 3b, the method 312 comprises one or more blocks implemented by the processor 110 for mapping of manual steps. The method 312 may be described in the general context of computer executable instructions. Generally, computer executable instructions can include routines, programs, objects, components, data structures, procedures, modules, and functions, which perform particular functions or implement particular abstract data types.

The order in which the method 312 is described is not intended to be construed as a limitation, and any number of the described method blocks can be combined in any order to implement the method 312. Additionally, individual blocks may be deleted from the method 312 without departing from the spirit and scope of the subject matter described herein. Furthermore, the method 312 can be implemented in any suitable hardware, software, firmware, or combination thereof.

In one embodiment, the TAS 102 reuses manual steps from the master database 107 for new automation test scripts based on the unique key reference value.

At block 314, automation test scripts are read. In one embodiment, the mapping module 116 receives automation test scripts 208 as input from testers or users of the automation framework and reads each automation test script 208 in an iteration. An exemplary automation test script may be illustrated as shown below in Table 3:

TABLE 3

| Step Name | Screen Name | Object Name | Action | Parameter | ErrorHandler |
| --- | --- | --- | --- | --- | --- |
| Step 1 | | | LAUNCH | APPLICATION_PATH | Next_TestCase |
| Step 2 | | | WAIT | 2 | Next_TestCase |
| Step 3 | | | EXECUTE | GTM_LOGIN | Next_TestCase |
| Step 4 | | | WAIT | 5 | |

At block 316, unique key reference value associated with automation test scripts is generated. In one embodiment, the mapping module 116 generates a unique key reference value 210 for each of the read automation test scripts 208 based on the one or more parameters associated with the automation test scripts 208. In one implementation, the unique key reference value 210 may be generated by concatenation of the one or more parameters of the automation test scripts 208. In another implementation, the unique key reference value 210 may be generated by any other known unique key generation techniques. Upon generating the unique key reference value, the mapping module 116 determines as to whether the generated unique key reference value already exists in the master database 107.

At block 318, manual step information corresponding to unique key reference value is derived. In one embodiment, if the mapping module 116 determines that the generated unique key reference value 210 do not exists in the master database 107, then the mapping module 116 creates a blank manual step comprising blank step description and expected results and maps the blank manual step with the automation test script 208 and proceeds to read the next automation test script 208. In another implementation, if the mapping module 116 determines that the generated unique key reference value 210 already exists in the master database 107, then the mapping module 116 derives the corresponding manual step information such as the step description and expected results from the master database 107.

At block 320, map automation test script with derived manual step information. In one embodiment, the mapping module 116 maps the derived manual step information with the automation test script 208 and proceeds to read the next automation test script 208. Thus, the TAS 102 enables reuse of the manual steps of the master database 107 for the automation test script 208 without recreating the manual steps. An exemplary automation test script after mapping of the manual steps may be illustrated as shown below in Table 4:

TABLE 4

| Step Name | Step description | Expected Result |
| --- | --- | --- |
| Step 1 | Launch GTM | GTM application should be launched |
| Step 2 | Wait for application to load | Wait for application to load |
| Step 3 | Login into GTM | Should able to login wit GTM application |
| Step 4 | Wait for application to load | Wait for application to load |

At block 322, master test repository is updated. In one embodiment, the TAS 102 continuously updates the master test repository 104 in incremental manner. In one embodiment, the database updating module 218 dynamically updates the master test repository 104 with new unique key reference values, new keywords, object names and so on that were not existing in the master database 107 during an iteration. The TAS 102 therefore, enables continuous learning and updating of the master test repository 104 in each iteration, thereby enabling effective reuse of the manual steps in future automation.

Thus, the system 100 enables reusing of available manual step information for automation test scripts to generate manual steps thereby, minimizing time and cost involved in creating manual steps for automation of testing applications.

Figure 4:
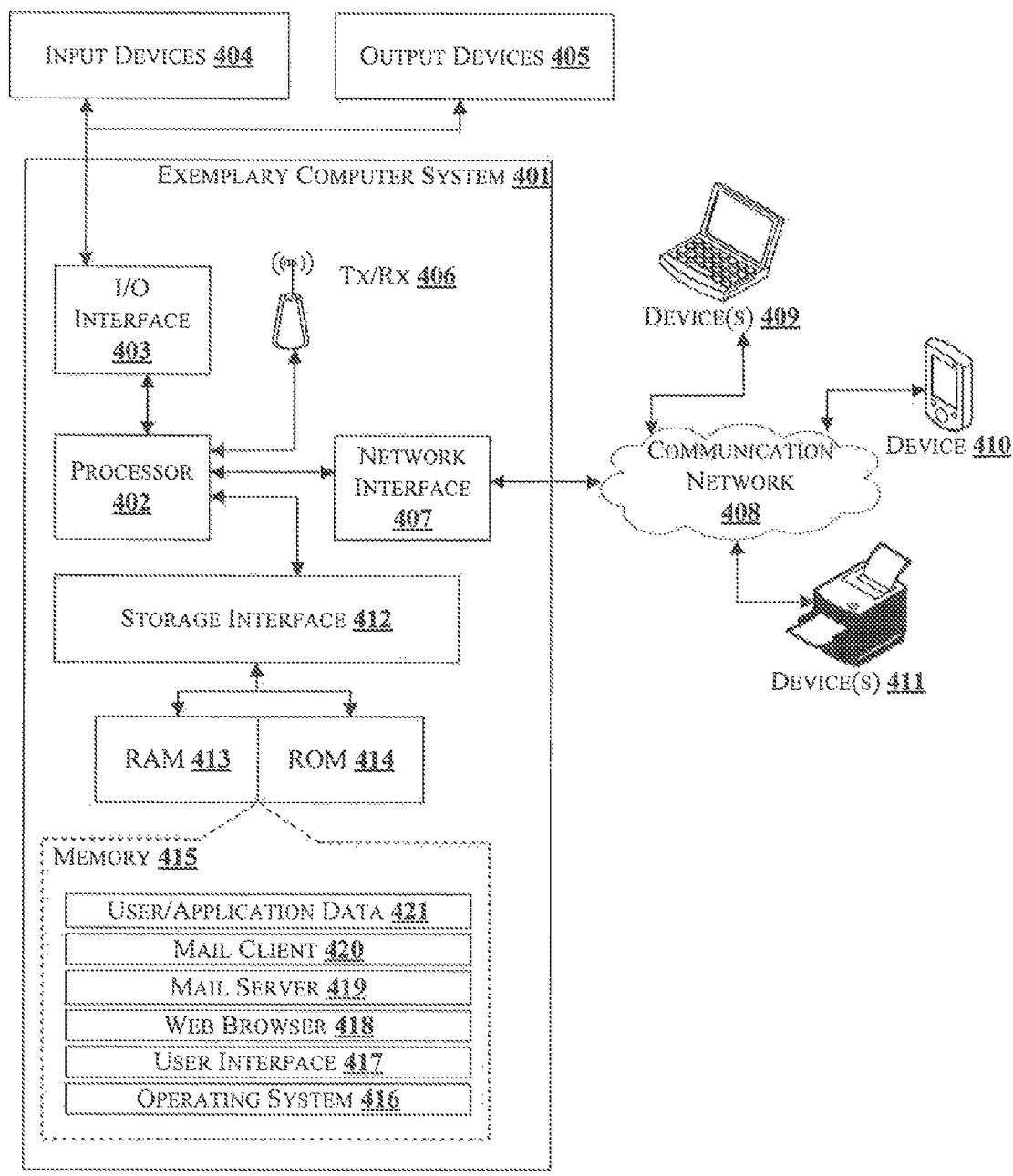
FIG. 4 is a block diagram of an exemplary computer system for implementing embodiments consistent with the present disclosure.

FIG. 4 is a block diagram of an exemplary computer system for implementing embodiments consistent with the present disclosure.

Variations of computer system 401 may be used for implementing all the computing systems that may be utilized to implement the features of the present disclosure. Computer system 401 may comprise a central processing unit ("CPU" or "processor") 402. The processor 402 may comprise at least one data processor for executing program components for executing user- or system-generated requests. The processor 402 may include specialized processing units such as integrated system (bus) controllers, memory management control units, floating point units, graphics processing units, digital signal processing units, etc. The processor 402 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (OSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, OPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver 406 may facilitate various types of wireless transmission or reception. For example, the transceiver may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface 407 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices 409, 410 and 411 may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console etc.), or the like. In some embodiments, the computer system 401 may itself embody one or more of these devices.

In some embodiments, the processor 402 may be disposed in communication with one or more memory devices (e.g., RAM 413, ROM 414 etc.) via a storage interface 412. The storage interface 412 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 415 may store a collection of program or database components, including, without limitation, an operating system 416 a user interface application 517 a web browser 418, a mail server 419, a mail client 420, user/application data 421 (e.g., any data variables or data records discussed in this disclosure), etc. The operating system 416 may facilitate resource management and operation of the computer system 401. Examples of the operating system 416 include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS, or the like. The user interface application 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, the computer system 401 may implement a web browser 418 stored program components. The web browser 418 may be a hypertext viewing application, such as MICROSOFT® INTERNET EXPLORER® web browser, GOOGLE® CHROME® web browser, MOZILLA® FIREFOX® web browser, APPLE® SAFARI® web browser etc. Secure web browsing may be provided using HTTPS (secure hypertext transport protocol), secure sockets layer (SSL), Transport Layer Security (TLS), etc. The web browser 418 may utilize facilities such as AJAX, DHTML, ADOBE® FLASH® platform, JAVASCRIPT® programming language, JAVA® programming language, application programming interfaces (APIs), etc. In some embodiments, the computer system 401 may implement a mail server 419 stored program components. The mail server 419 may be an Internet mail server such as MICROSOFT® EXCHANGE® or the like. The mail server 419 may utilize facilities such as ASP, ActiveX, ANSI C++/C#, MICROSOFT .NET® CGI scripts, JAVA® programming language, JAVASCRIPT® programming language, PERL® programming language, PHP® programming language, PYTHON® programming language, WebObjects, etc. The mail server 419 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program components. The mail client 420 may be a mail viewing application, such as APPLE MAIL® mail client, MICROSOFT ENTOURAGE® mail client, MICROSOFT OUTLOOK® mail client, MOZILLA THUNDERBIRD® mail client etc.

In some embodiments, computer system 401 may store user/application data 421, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

Advantages of the embodiment of the present disclosure are illustrated herein

In an embodiment, the present disclosure enables reusability of manual steps for new automation test script without the requirement of recreating the manual steps, thereby minimizing time and cost involved in creating manual steps for automation of testing applications.

In an embodiment, the present disclosure enables continuous updating of the master test repository with new keywords, thereby refining the master test repository to address future needs in the testing automation.

It is intended that the disclosure and examples be considered as exemplary only, with a true scope and spirit of disclosed embodiments being indicated by the following claims.

What is claimed is:

1. A method of controlling automation of testing applications, said method comprising:
   receiving, by a processor of a test automation system, a plurality of new automation test scripts as input from a test automation framework;
   determining, by the processor, a unique key reference value for a new automation test script from the plurality of new automation test scripts, wherein the unique key reference value is a concatenation of a screen name, an object name, an action and related parameters of the new automation test script;
   deriving, by the processor, manual step information for the new automation test script from a master database based on the unique key reference value, wherein the master database stores a plurality of manual step information corresponding to a plurality of historical automation test scripts, and wherein deriving the manual step information comprises:
      determining that the unique key reference value of the new automation test script is existing in the master database; and retrieving the manual step information associated with a historical automation test script that has same unique key reference value as the new automation test script, for reuse during automation of the new automation test script, based on determination of existence of the unique key reference value in the master database;

generating, by the processor, manual steps for the new automation test script by reusing the manual step information of the historical automation test script; and controlling, by the processor, the automation of the testing applications based on the generated manual steps for the new automation test script, wherein the master database is updated with the reusable manual step information, the unique key reference value, and the new automation test script, for subsequent automation test scripts.

2. The method as claimed in claim 1, further comprising:
receiving the plurality of historical automation test scripts and the plurality of manual step information comprising a step description and expected test results associated with the plurality of historical automation test scripts;
generating a unique key reference value for the plurality of historical automation test scripts based on one or more parameters associated with the plurality of historical automation test scripts;
deriving the manual step information comprising a step name, a step description and expected result associated with the generated unique key reference value; and
creating the master database comprising the manual step information and the corresponding unique key reference value associated with the plurality of historical automation test scripts.

3. The method as claimed in claim 1, wherein
retrieving the manual step information comprising step description and expected results from the master database corresponding to the unique key reference value based on the determination.

4. The method as claimed in claim 1, wherein creating the master database comprising:
determining that the unique key reference value does not exist in the master database; and
updating the master test repository with the unique key reference value and the corresponding step description and the expected results associated with the plurality of historical automation test script based on the determination of non-existence of the unique key reference value in the master database.

5. A test automation system, comprising:
a master test repository, configured to store a master database, a plurality of historical automation test scripts, and corresponding manual step information and unique key reference value associated with the plurality of historical automation test scripts;
a processor coupled with the master test repository; and
a memory, communicatively coupled to the processor, wherein the memory stores processor-executable instructions, which, on execution, cause the processor to:
receive a plurality of new automation test scripts as input from a test automation framework;
determine a unique key reference value for a new automation test script from the plurality of new automation test scripts, wherein the unique key reference value is a concatenation of a screen name, an object name, an action and related parameters of the new automation test script;
derive manual step information for the new automation test script from the master database based on the unique key reference value of the new automation test script, wherein deriving the manual step information comprises:
determining that the unique key reference value of the new automation test script is existing in the master database; and
retrieving the manual step information associated with a historical automation test script that has same unique key reference value as the new automation test script, for reuse during automation of the new automation test script, based on determination of existence of the unique key reference value in the master database;
generate manual steps for the new automation test script by reusing the manual step information of the historical automation test script; and
control the automation of the testing applications based on the generated manual steps for the new automation test script, wherein the master database is updated with the reusable manual step information, the unique key reference value, and the new automation test script, for subsequent automation test scripts.

6. The system as claimed in claim 5, wherein the processor is further configured to:
receive the plurality of historical automation test scripts and the plurality of manual step information comprising a step description and expected test results associated with the plurality of historical automation test scripts;
generate a unique key reference value for the plurality of historical automation test scripts based on one or more parameters associated with the plurality of historical automation test scripts;
derive the manual step information comprising a step name, a step description and expected result associated with the generated unique key reference value; and
create the master database comprising the manual step information and the corresponding unique key reference value associated with the plurality of historical automation test scripts.

7. A non-transitory computer readable medium including instructions stored thereon that when processed by at least one processor cause a test automation system to perform acts of:
receiving a plurality of new automation test scripts as input from a test automation framework;
determining a unique key reference value for a new automation test script from the plurality of new automation test scripts, wherein the unique key reference value is a concatenation of a screen name, an object name, an action and related parameters of the new automation test script;
deriving manual step information for the new test script from the master database based on the unique key reference value of the new automation test script, wherein the master database stores a plurality of manual step information corresponding to a plurality of historical automation test scripts, and wherein deriving the manual step information comprises:
determining that the unique key reference value of the new automation test script is existing in the master database; and retrieving the manual step information associated with a historical automation test script that has same unique key reference value as the new automation test script, for reuse during automation of the new automation test script, based on determination of existence of the unique key reference value in the master database;

generating manual steps for the new automation test script by reusing the manual step information of the historical automation test script; and controlling the automation of the testing applications based on the generated manual steps for the new automation test script, wherein the master database is updated with the reusable manual step information, the unique key reference value, and the new automation test script, for subsequent automation test scripts.

8. The medium as claimed in claim 7, wherein the instructions stored thereon further cause the at least one processor to:

receive the plurality of historical automation test scripts and the plurality of manual step information comprising a step description and expected test results associated with the plurality of historical automation test scripts;

generate a unique key reference value for the plurality of historical automation test scripts based on one or more parameters associated with the plurality of historical automation test scripts;

derive the manual step information comprising step name, step description and expected result associated with the generated unique key reference value; and create the master database comprising the manual step information and the corresponding unique key reference value associated with the plurality of historical automation test scripts.

* * * * *